(12) United States Patent
Wang et al.

(10) Patent No.: US 8,917,907 B2
(45) Date of Patent: Dec. 23, 2014

(54) CONTINUOUS LINEAR DYNAMIC SYSTEMS

(75) Inventors: Jinjun Wang, San Jose, CA (US); Jing Xiao, Cupertino, CA (US)

(73) Assignee: Seiko Epson Corporation, Tokyo (JP)

( * ) Notice: Subject to any disclaimer, the term of this patent is extended or adjusted under 35 U.S.C. 154(b) by 408 days.

(21) Appl. No.: 13/406,011

(22) Filed: Feb. 27, 2012

(65) Prior Publication Data

US 2012/0219186 A1 Aug. 30, 2012

Related U.S. Application Data

(60) Provisional application No. 61/447,502, filed on Feb. 28, 2011.

(51) Int. Cl.
*G06K 9/00* (2006.01)
*G06K 9/62* (2006.01)

(52) U.S. Cl.
CPC ........ *G06K 9/00765* (2013.01); *G06K 9/00335* (2013.01); *G06K 9/6297* (2013.01)
USPC ............ 382/103; 382/159; 382/190; 382/224

(58) Field of Classification Search
CPC .......... G06K 9/00335; G06K 9/00765; G06K 9/6297
USPC .................................. 382/103, 159, 190, 224
See application file for complete search history.

(56) References Cited

U.S. PATENT DOCUMENTS

| | | |
|---|---|---|
| 6,993,462 B1 | 1/2006 | Pavlovic et al. |
| 6,999,601 B2 | 2/2006 | Pavlovic et al. |
| 2011/0116711 A1 | 5/2011 | Wang et al. |

OTHER PUBLICATIONS

Oh et al., "Learning and Inference in Parametric Switching Linear Dynamic Systems", Proceedings of the Tenth IEEE International Conference on Computer Vision (ICCV'05).*
Mesot et al., "A Simple Alternative Derivation of the Expectation Correction Algorithm", IEEE Signal Processing Letters, vol. 16, No. 2, Feb. 2009, 121-124.*
Huang et al., "Variable Duration Motion Texture for Human Motion Modeling" PRICAI 2006, LNAI 4099, pp. 603-612, 2006.*
Fox et al., "An HDP-HMM for Systems with State Persistence", Proceedings of the 25 th International Conference on Machine Learning, Helsinki, Finland, 2008.*
Fan, X, et al., "Generative Models for Maneuvering Target Tracking", Accepted by IEEE Transactions on Aerospace and Electronic Systems, Dec. 2008.
Mikolajczyk, K., et al., "Scale & Affine Invariant Interest Point Detectors", International Journal of Computer Vision 60(1), 63-86, 2004.
Natarajan, P., et al., "Graphical Framework for Action Recognition using Temporally Dense STIPs", Motion and Video Computing 2009, WMVC '09 workshop, Dec. 8-9, 2009.

(Continued)

*Primary Examiner* — Katrina Fujita

(57) ABSTRACT

Aspects of the present invention include systems and methods for segmentation and recognition of action primitives. In embodiments, a framework, referred to as the Continuous Linear Dynamic System (CLDS), comprises two sets of Linear Dynamic System (LDS) models, one to model the dynamics of individual primitive actions and the other to model the transitions between actions. In embodiments, the inference process estimates the best decomposition of the whole sequence into continuous alternating between the two set of models, using an approximate Viterbi algorithm. In this way, both action type and action boundary may be accurately recognized.

15 Claims, 10 Drawing Sheets

(56) References Cited

OTHER PUBLICATIONS

Mikolajczyk, K., et al., "Action Recognition with Motion-Appearance Vocabulary Forest" Computer Vision and Pattern Recognition, 2008. CVPR 2008. IEEE Conference, pp. 1-8, Jun. 23-28, 2008.

Wang, X., et al., "Feature Context for Image Classification and Object Detection", Computer Vision and Pattern Recognition, (CVPR), 2011 IEEE Conference, pp. 961-968, Jun. 20-25, 2011.

Schuldt, C., et al., "Recognizing Human Actions: A Local SVM Approach", Pattern Recognition, 2004. ICPR 2004. Proceedings of the 17th International Conference, pp. 32-36, vol. 3, Aug. 23-26, 2004.

Wang, J., et al., "Locality-constrained Linear Coding for Image Classification", Computer Vision and Pattern Recognition (CVPR), 2010 IEEE Conference, pp. 3360-3367, Jun. 13-18, 2010.

* cited by examiner (a) IXMAS Dataset -- Subject 1 trial 3

(b) IXMAS Dataset -- Subject 9 trial 2

N = noise
CW = check watch    TA = turn around
C = cross arm       W = walk
SH = scratch head   Wa = wave
SD = sit down       P = punch
GU = get up         K = kick

CONTINUOUS LINEAR DYNAMIC SYSTEMS

CROSS-REFERENCE TO RELATED APPLICATION

This application claims the priority benefit under 35 USC §119(e) to commonly assigned U.S. Patent Application No. 61/447,502, filed on Feb. 28, 2011, entitled "Simultaneously Segmentation and Recognition of Continuous Action Primitives" and listing as inventors Jinjun Wang and Jing Xiao. The aforementioned patent document is incorporated by reference herein in its entirety.

This application is related to commonly assigned and co-pending U.S. patent application Ser. No. 13/405,986, filed on the same day herewith, entitled "EMBEDDED OPTICAL FLOW FEATURES," and listing as inventors Jinjun Wang and Jing Xiao. The aforementioned patent document is incorporated by reference herein in its entirety.

BACKGROUND

1. Field of Invention

The present patent document is directed towards systems and methods for segmentation and recognition of actions, including action transitions.

2. Description of the Related Art

Vision-based action recognition has wide application. For example, vision-based action recognition may be used in driving safety, security, signage, home care, robot training, and other applications.

One important application of vision-based action recognition is Programming-by-Demonstration (PbD) for robot training For Programming-by-Demonstration, a task to train is often decomposed into primitive action units. For example, in Programming-by-Demonstration, a human demonstrates a task that is desired to be repeated by a robot. While the human demonstrates the task, the demonstration process is captured by sensors, such as a video or videos using one or more cameras. These videos are segmented into individual unit actions, and the action type is recognized for each segment. The recognized actions are then translated into robotic operations for robot training.

To recognize unit actions from video segments, reliable image features are important. To be effective, the image features ideally should satisfy a number of criteria; such as, for example, they should be able to identify actions in different demonstration environments. Second, they should support continuous frame-by-frame action recognition. And, they should have low computational costs.

To segment and recognize unit actions from such videos, a proper classification algorithm is needed. The classifier used for such applications should satisfy several conditions. First, it should be able to model temporal image patterns by actions in controlled environments. Second, it should be capable of continuous action recognition. And third, it should be able to be generalized from small training data sets. Existing techniques typical do not satisfy all of these criteria.

Continuous action recognition is a challenging computer vision task because multiple actions are performed sequentially without clear boundary, which requires the analysis between action segmentation and classification to be performed simultaneously. In some simplified scenario, action boundary segmentation and action type recognition may be approached separately, or the temporal recognition problem may be converted into identifying representative static template, such as those that identify unique hand shape, hand orientation or hand location matching for hand gesture/sign language recognition.

For temporal pattern classification, existing works may be categorized into template based and model based. A template may consist of features extracted from "key-frame" or exemplar sequences, and the classification/matching process usually requires task-specific similarity measures. Compared to a template-based classifier, the model-based approach allegedly provides more flexibility and generality. Among popular model-based methods that are capable of continuous action recognition, Switching Linear Dynamic System (SLDS) has been offered to describe complex temporal patterns and has shown advantages over other methods, such as Hidden Markov Model, Conditional Random Field (CRF), Switched Autoregressive, and Gaussian process. In SLDS, a set of Linear Dynamic Systems (LDS) are respectively trained to model individual actions, and the transitions between these LDSs are inferred by higher-level statistics to recognize continuous actions. SLDS provides an intuitive framework for describing the continuous but non-linear dynamic of real-world motion, and is proven effective for texture analysis and synthesis, recognizing bee dancing and human actions with accurate motion representation, such as kinematic model parameters, joint trajectory, and joint angle trajectory.

However, SLDS applies the learned dynamics in individual actions to estimate the transition between multiple actions, which leads to at least three limitations. First, the transition of state sequence within an action has different patterns from that of between actions. Second, the action transition prior used by SLDS is only based on simple cooccurrence count between actions; that is, it is a scalar value only and once trained is independent of the observations. And third, in SLDS, it is difficult to distinguish between the state transition within an action primitive or between two repeating primitives. While the third limitation may be ignorable in some instances where an action can continue for any duration, sufficiently robust systems should be able to segment and classify repeated action primitives.

Accordingly, systems and methods are needed that provide more dynamic and improved temporal pattern classification.

BRIEF DESCRIPTION OF THE DRAWINGS

Reference will be made to embodiments of the invention, examples of which may be illustrated in the accompanying figures, in which like parts may be referred to by like or similar numerals. These figures are intended to be illustrative, not limiting. Although the invention is generally described in the context of these embodiments, it should be understood that it is not intended to limit the scope of the invention to these particular embodiments.

SUMMARY OF INVENTION

Figure 1C:
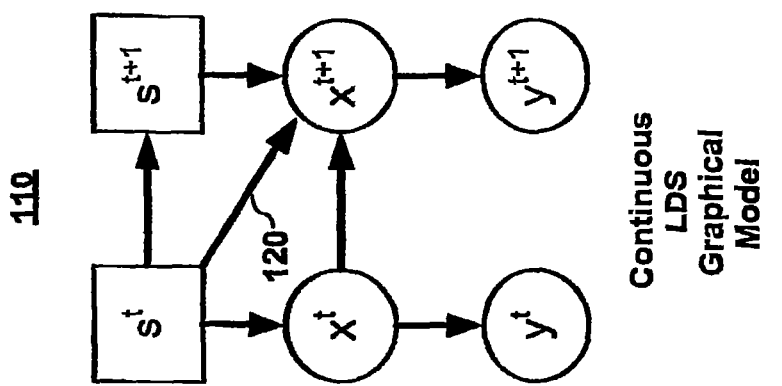
FIG. 1(c) depicts a graphical representation of a Continuous Linear Dynamic System (CLDS) according to embodiments of the present invention.

Aspects of the present invention include systems and methods for segmentation and recognition of action primitives. Embodiments also include using an embedded optical flow feature for model training and/or detection purposes. Embodiments of the present invention include methods that have been encoded upon one or more computer-readable media with instructions for one or more processors or processing units to perform. The method may include a plurality of instructions that are executed by the processor.

As previously noted, standard SLDS based on first-order Markov assumption does not yield the best performance, particularly when dealing with between action transitions. Presented herein are embodiments of dynamic-system-based framework to model the temporal evolution of a feature for action analysis. In embodiments, the framework utilizes higher-order information to explicitly model the transition within single action primitive or between successive action primitives. In embodiments, the framework, referred to as the Continuous Linear Dynamic System (CLDS) framework, comprises two sets of Linear Dynamic System (LDS) models, one to model the dynamics of individual primitive actions and the other to model the transition between actions. In embodiments, the inference process estimates the best decomposition of a whole sequence by continuously alternating between the two set of models. In embodiments, an approximate Viterbi algorithm may be used in the inference process. Using the CLDS framework, both action type and action boundary may be accurately recognized.

In embodiments, a computer-readable medium or media comprises one or more sequences of instructions which, when executed by one or more processors, causes steps for recognizing a sequence of actions comprising: segmenting input sensor data into time frames, generating a feature for each time frame, and for a time frame, selecting an action associated with a maximized value of an objective function that comprises a first set of feature-dependent models for intra-action transitions and a second set of feature-dependent models for inter-action transitions. In embodiments, the feature-dependent models are based upon linear dynamic system models.

In embodiments, the objective function models a hidden state at a current time frame as being directly dependent upon a hidden state for a sequence of one or more time frames prior to the current time frame, an estimated action for the sequence of one or more time frames prior to the current time frame, and an estimated action of the current time frame.

In embodiments, the feature-dependent models for inter-action transitions may include models to model transitions between the same action. For example, the feature-dependent models may include models to cover transitions for when an action repeats.

In embodiments, the input sensor data is a video and the time frame data may be image frames. In embodiments, a feature generated for an image frame may be an embedded optical flow feature.

In embodiments, a computer-readable medium or media comprises one or more sequences of instructions which, when executed by one or more processors, causes steps to be performed that comprise modeling actions and modeling one or more action transitions. In embodiments, the actions models may comprises a plurality of action dynamic models, wherein each dynamic model comprises a label associated with an action that it models, and one or more transition models model between action transitions, wherein each transition dynamic model comprises a label associated with a transition between actions that it models. In embodiments, for a feature representing a set of input sensor data for a time frame, an action may be selected that is associated with the dynamic model that maximizes an objective function, wherein a transition probability from one action to another action is non-scalar and is calculated using at least one transition dynamic model.

Also disclosed herein are embodiments of reliable image features, referred to herein as the embedded optical flow (EOF) features. In embodiments, the EOF feature is based on embedding optical flow at interest points using Locality-constrained Linear Coding with weighted average pooling. In embodiments, the EOF feature is histogram-like but presents excellent linear separability. In embodiments, the EOF feature is able to take advantage of both global and local information by being spatially "global" and temporally "local." EOF is spatially global in that it considers the distribution of optical flow information from each of a set of frames, and it is also temporally local in that it represents individual frames. In embodiments, the temporal evolution of EOF may be modeled by a sequential classifier.

In embodiments, a computer-implemented method for generating an EOF comprises obtaining a set of local motion features, or optical flows, for an image frame from a video or other sensor. For each local motion feature from a set of local motion features, a sparse coding vector is generated and the EOF is formed to represent the image frame by a weighted pooling of the sparse coding vectors, wherein the weighting is based upon a distribution of local motion features in the image frame.

In embodiments, the weighted pooling may be done by pooling sparse coding vectors for the image frame by weighting each sparse coding vector in relation to a posterior of a local motion feature corresponding to the sparse coding vector. In embodiments, the weighted pooling may be done by weighting each sparse coding vector by an inverse proportional to a square root of a posterior of a local motion feature corresponding to the sparse coding vector. For example, in embodiments, the equation, $$y = CP_o^{\frac{1}{2}}(X),$$

may be used to generate the feature, where y represents the image feature for the image frame, C represents a matrix of spare coding vectors for the image frame, $P_o(X)$ represents a matrix of posterior values for local motion features. In embodiments, the pooled sparse coding vectors are also normalized to form the image feature.

In embodiments, Locality-constrained Linear Coding (LLC) and a codebook may be used to generate spares coding vectors. In embodiments, at least some of the local motion vectors, or optical flows, may be used to generate a codebook.

In embodiments, the method may include extracting frames from a video.

In embodiments, the method may include extracting feature points from the frames in order to obtain optical flows for the frames.

In embodiments, the EOF features may be used to train a model for action detection, may be used by a trained model for detecting one or more actions, or both.

It shall be noted that although embodiments described herein have been within the context of video data, the invention elements of the current patent document are not so limited. Accordingly, the invention elements may be applied in other context and on other input sensor data.

Some features and advantages of the invention have been generally described in this summary section; however, additional features, advantages, and embodiments are presented herein or will be apparent to one of ordinary skill in the art in view of the drawings, specification, and claims hereof. Accordingly, it should be understood that the scope of the invention shall not be limited by the particular embodiments disclosed in this summary section.

DESCRIPTION OF THE PREFERRED EMBODIMENTS

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described herein, may be implemented in a variety of ways, including software, hardware, firmware, or combinations thereof.

Components, or modules, shown in block diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components or modules.

Furthermore, connections between components within the figures are not intended to be limited to direct connections. Rather, data between these components may be modified, re-formatted, or otherwise changed by intermediary components. Also, additional or fewer connections may be used. It shall also be noted that the terms "coupled" or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. The appearances of the phrases "in one embodiment," "in an embodiment," or "in embodiments" in various places in the specification are not necessarily all referring to the same embodiment or embodiments. It shall be noted that the use of the terms "set" and "sequence" in this patent document shall include any number of elements.

Background

1. Linear Dynamic System (LDS) for Single Action

A Linear Dynamic System (LDS) model is a time-series state-space model that comprises a linear dynamics model and a linear observation model. FIG. 1(a) depicts a graphical representation of an LDS model. The Markov chain represents the evolution of a continuous hidden states x with prior density $x^0 \sim \mathcal{N}(\mu^0, \Sigma^0)$. The state $x^t$ is obtained by the product of the transition matrix F and the previous state $x^{t-1}$ corrupted by additive white noise $v^t \sim \mathcal{N}(0, Q)$. The measurement $y^t$ is generated from the current state $x^t$ through observation matrix H corrupted by white observation noise $w^t \sim N(0, R)$, $$x^{t+1} = Fx^t + v^{t+1}, \quad (1)$$

$$y^{t+1} = Hx^{t+1} + w^t. \quad (2)$$

Thus, an LDS model is defined by the tuple $\{(\mu^0, \Sigma^0), (F, Q), (H, R)\}$. The LDS inference process strives to estimate the optimal action label s in a discrete label space $\{\mathbb{S}\}$ and the sequence of hidden state $X = [x^1, x^2, \ldots, x^T]$ for a given observation $Y = [y^1, y^2, \ldots, y^T]$ by maximizing:

$$P(s \mid Y^T, X^T) \propto P(Y^T \mid s, X^T) P(X^T \mid s) Pr(s) = \quad (3)$$

$$Pr(s) \prod_{t=1}^{T-1} P(y^{t+1} \mid x^{t+1}, s) P(x^{t+1} \mid x^t, s),$$

where $P_r(s)$ represent the prior of label s. According to Equation (1) and Equation (2), $P(y^{t+1} \mid x^{t+1}, s)$ and $P(x^{t+1} \mid x^t, s)$ can be obtained from Kalman smoothing.

2. Switching Linear Dynamic System (SLDS)

An SLDS model describes the dynamics of a more complex process by switching among a set of LDS models over time. The inference process estimates both the optimal state sequence $X = [x^1, x^2, \ldots, X^T]$ and the optimal sequence of action labels $S = [s^1, s^2, \ldots, s^T]$ with each $s^t \in \{\mathbb{S}\}$, from the observation sequence $Y = [y^1, y^2, \ldots, y^T]$. Exact calculation of all possible S setting is intractable, and reported inferencing algorithm includes Viterbi, Variational and Generalized Psuedo Bayesian, which are known to those of ordinary skill in the art. For instance, the approximate Viterbi algorithm solves the inference problem by sequentially decomposing it into sub-problems. According to Equation (3), we can have $$P(s^{t+1} \mid Y^{t+1}, X^{t+1}) = \sum_{s^t} P(s^{t+1} \mid y^{t+1}, x^{t+1}, Y^t, X^t, s^t) P(s^t \mid Y^t, X^t) \quad (4)$$

$$\approx \max_{s^t} P(s^{t+1} \mid y^{t+1}, x^{t+1}, x^t, s^t) P(s^t \mid Y^t, X^t)$$

which is recursive. The heart of the recursion is to find the best transition $P(s^{t+1}|y^{t+1}, x^{t+1}, x^t, s^t)$ for any given $P(s^t|Y^t, X^t)$. Since $$P(s^{t+1}|y^{t+1},x^{t+1},x^t,s^t) \propto P(y^{t+1}|x^{t+1},s^{t+1})P(x^{t+1}|x^t,s^{t+1})Pr(s^{t+1}|s^t) \qquad (5)$$

Figure 1B:
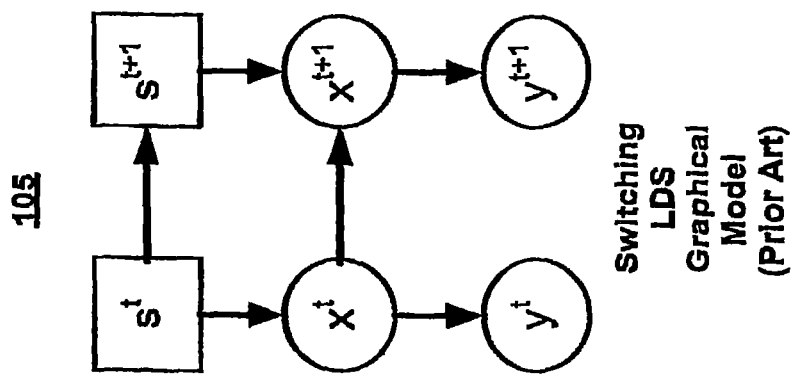
FIG. 1(b) depicts a graphical representation of a Switching Linear Dynamic System (SLDS).
Figure 1A:
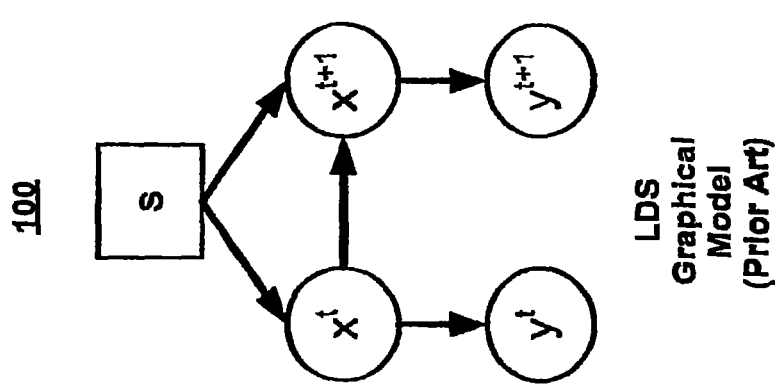
FIG. 1(a) depicts a graphical representation of a Linear Dynamic System (LDS).

SLDS uses the following state-space equations, $$x^{t+1} = F(s^{t+1})x^t + v^{t+1}, \qquad (6)$$

$$y^{t+1} = H(s^{t+1})x^{t+1} + w^{t+1}(s^{t+1}), \qquad (7)$$

where switching between different LDSs is a discrete first-order Markov process controlled by the state variables $s^t$ as illustrated in FIG. 1(b), which is a graphical model of an SLDS. The switching model is defined with the state transition matrix M where $m_{ij} = Pr(s^{t+1}=j|s^t=i)$ in Equation (5) and an initial state distribution $m^0$. The LDS and switching process are coupled due to the dependence of the LDS parameters F and Q on the switching state $s^t$, i.e., $F(s^t=i)=F_i$ and $Q(s^t=i)=Q_i$. It should be noted that a transition probability is a single scalar value based upon training data and is independent of the input observations, which may be an image feature.

Linear Dynamic System for Actions and Action Transitions

To overcome the limitations of prior approaches, embodiments of the present invention explicitly model the temporal transitions between neighboring action primitives. In this way, the probability of transition between two primitives depends not only on the cooccurrence statistics of the two, but also depends on the observation. In embodiments, between action transitions are modeled using a set of LDSs, and an inference process outputs an optimal decomposition of a video into continuous alternating between the intra-action LDSs and inter-action LDSs. This novel approach may be referred herein as Continuous LDS (CLDS). Also, in embodiments, a modified Viterbi algorithm is presented below for inferencing both the action type and action boundary in the CLDS framework.

In Equation (6), SLDS applies a state transition matrix of the next hypothesized LDS model $s^{t+1}$ to estimate the transition from the current action label $s^t$. As explained above, F is trained to model the dynamics within an action; therefore, the capacity of any F is limited when used to model the transition between actions.

To better describe the state transition probability, the duration information of actions has been considered in the duration SLDS framework (dSLDS), where the semi-Markov transition probability is calculated with one added counter variable that keeps increasing (for intra action) or resetting (for inter action). Alternatively, it has been proposed to use a second-order SLDS with the following transition equation:

$$x^{t+1} = F(s^{t+1})x^t + F(s^t)x^{t-1} + v^{t+1}s^{t+1}.$$

However, even this approach is deficient. For example, it does not address the issue of SLDS with respect to distinguishing repeated action primitives of the same type. In contrast to the prior approaches, embodiments of the CLDS train another set of LDSs to explicitly learn the dynamics of transition between any two primitive actions and introduce the following state-space transition equations for SLDS:

$$x^{t+1} = F(s^{t+1}, s^t)x^t + v^{t+1}(s^{t+1}, s^t), \qquad (8)$$

$$y^{t+1} = H(s^{t+1}, s^t)x^{t+1} + w^{t+1}(s^{t+1}, s^t), \qquad (9)$$

where $v \sim \mathcal{N}(0, Q(s^{t+1}, s^t))$ and $w \sim \mathcal{N}(0, R(s^{t+1}, s^t))$.

In embodiments, these additional LDSs may be referred to as the Transition LDS, and the LDSs for action primitives may be referred to as the Action LDS. It shall be noted that, in embodiments, since a Transition LDS is trained from portions of action transitions, intuitively it serves as a binary classifier for boundary/non-boundary decision, and effectively it helps bridging the gap between neighboring action primitives. Thus, in embodiments, a continuous video may be decomposed by continuously alternating between Action LDSs and Transition LDSs; hence, the name for this new framework is aptly Continuous LDS.

FIG. 1(c) depicts a graphical representation of a Continuous Linear Dynamic System (CLDS) according to embodiments of the present invention. The graphical model in FIG. 1(c) depicts three levels. The first level, y, represents that observation, which, in embodiments, may be an image feature representing a video frame. The next level, x, represents the hidden state or latent variable. Finally, the top level, s, represents the action label. The arrows represent the relationships between these elements. It shall be noted that unique to CLDS, is the direct influence 120 that the estimated action label for the prior time sequence, $s^t$, has on the hidden state for a current time frame under consideration, namely $x^{t+1}$. The next section explains embodiments of the inference process in CLDS.

Inference and Training

Having both the Action LDS and the Transition LDS, CLDS gains more flexibility during the inference process. In embodiment, an observation-dependent transition probability (through the hidden layer X) may be calculated using the corresponding set of LDSs, determined by both the current and the next action labels. In embodiments, the inference process of CLDS may also use approximate Viterbi algorithm, where F is selected by $$F(s^{t+1}, s^t) = \begin{cases} F_i & s^t \& s^{t+1} \text{ in same action } i \\ F_{ij} & s^t = i \& s^{t+1} = j \end{cases} \qquad (10)$$

where $F_i$ is from Action LDS i, and $F_{ij}$ is from Transition LDS i to j. It shall be noted that $F_{ii} \neq F_i$; rather $F_{ii}$ is from Transition LDS i to i, (i.e., the same action is repeating). Q, H, and R, may be selected similarly. In embodiments, during the Viterbi decoding process, ideally when states transit within an action primitive i, selecting $F(s^{t+1}, s^t) = F_i$ will generate higher probability, while when states transit between two primitives i to j, selecting $F(s^{t+1}, s^t) = F_{ij}$ will yield higher probability. Hence, CLDS can easily identify action boundaries, which are the instances when state transits between actions, and the corresponding frames are action boundaries.

In embodiments, the CLDS inference process strives to estimate the optimal action label $S = \{s^1, s^2, \ldots, s^T\}$ with each $s^i$ in a discrete label space $\{\mathbb{S}\}$ by maximizing:

$$P(S^T|Y^T, X^T)$$

Using Viterbi algorithm, the overall objective function may be maximized by recursively maximizing $$P(s^{t+1}|Y^{t+1}, X^{t+1}) \approx \max_s P(s^{t+1}|y^{t+1}, x^{t+1}, x^t, s^t)P(s^t|Y^t, X^t),$$

in which the first term $P(s^{t+1}|y^{t+1}, x^{t+1}, x^t, s^t) \propto P(y^{t+1}, s^{t+1}, s^t)P(x^{t+1}|x^t, s^{t+1}, s^t)P(s^{t+1}|s^t)$. $P(y^{t+1}|x^{t+1}, s^{t+1}, s^t)$ and $P(x^{t+1}|x^t, s^{t+1}, s^t)$ may be obtained using Equation (8) and Equation (9) respectively.

An embodiment of a detailed inference process is illustrated in Table 1, below. It shall be noted that the depicted inference process is one embodiment and that other implementations may be used. Accordingly, the depicted embodiment shall not be used to limit the spirit and scope of the current disclosure.

TABLE 1

Embodiment of CLDS Inference input: Action LDS $\theta_i$, Transition LDS $\theta_{ij}$, i, j = 1 ~ K types, observation Y
output: Label sequence s, Boundary sequence d
1:   $\mathcal{P}$ ← K × (T + 1) matrix, $\mathcal{A}$ ← K × T matrix, $\mathcal{D}$ ← K × T matrix,
    X ← K × (T + 1) cell, $\mathcal{S}$ ← K × (T + 1) cell
2:   init $\mathcal{P}$ (i, 0), X(i, 0) and $\mathcal{S}$ <(i, 0) with $\theta_i$, i = 1 ~ C
    {Transition probability}
3:   for t = 0 to T − 1 do
4:     for i = 1 to K do
5:       Predict and filter LDS state estimation $x_s^{t+1|t,i}$ and $\Sigma_s^{t+1|t,i}$
      with X(i, t), $\mathcal{S}$ (i, t) and $\theta_i$
6:       $P_s$ ← $P(s^{t+1} = i | y^{t+1}, x_s^{t+1|t,i}, s^t = i) \mathcal{P}$ (i, t)
7:       for j = 1 to K do
8:         Predict and filter LDS state estimation $x_j^{t+1|t,i,j}$ and
        $\Sigma_j^{t+1|t,i,j}$ with X(j, t), $\mathcal{S}$ (j, t) and $\theta_{ij}$
9:         $P_b(j)$ ← $P(s^{t+1} = i | y^{t+1}, x_j^{t+1|t,i,j}, s^t = j) \mathcal{P}$ (j, t)
10:      end for
11:     j* ← argmax$_j$ $P_b(j)$
12:     if $P_b(j^*) < P_s$ then
13:       $\mathcal{P}$ (i, t + 1) ← $P_s$, $\mathcal{A}$ (i, t + 1) ← i, $\mathcal{D}$(i, t + 1) ← 0,
      X(i, t + 1) ← $x_s^{t+1|t,i}$, $\mathcal{S}$ (i, t + 1) ← $\Sigma_s^{t+1|t,i}$
14:     else
15:       $\mathcal{P}$ (i, t + 1) ← $P_b(j^*)$, $\mathcal{A}$ (i, t + 1) ← j*, $\mathcal{D}$(i, t + 1) ← 1,
      X(i, t + 1) ← $x_{j^*}^{t+1|t,i,j}$, $\mathcal{S}$ (i, t + 1) ← $\Sigma_{j^*}^{t+1|t,i,j}$
16:     end if
17:   end for
18: end for
    {Trace back}
19: i* ← argmax$_i$ $\mathcal{P}$ (i, T)
20: for t = T to 1 do
21:   s(t) ← i*, d(t) ← $\mathcal{D}$ (i*, t)
22:   i* ← $\mathcal{A}$ (i*, t)
23: end for In embodiments, the Transition LDS and Action LDS may be trained jointly by expectation-maximization (EM) algorithm, which is well known to those of ordinary skill in the art. In embodiments, in the E step, the optimal decomposition of the example sequences into intra/inter-action transitions are obtained; and in the M step, the LDS model parameters are learned by Maximum a Posteriori estimation. Since the action boundaries are usually given in training, it is straightforward to partition the sequences accordingly to initialize the EM process. In embodiments, approximated decomposition is sufficient if the portions between two boundaries are treated as intra-action segments, and the portions that cover the offset (ending) of a first action and the onset (starting) of the following action are used as inter-action transition segments.

Exemplary Systems and Methods

Given the Continuous Linear Dynamic Systems framework, presented below are examples of systems and methods that may employ the inventive concepts of the CLDS. It shall be noted that these embodiments are presented to elucidate some example applications, and that one skilled in the art shall recognize other applications (both systems and methods), and these additional applications shall be considered within the scope of the current patent document.

Figure 2:
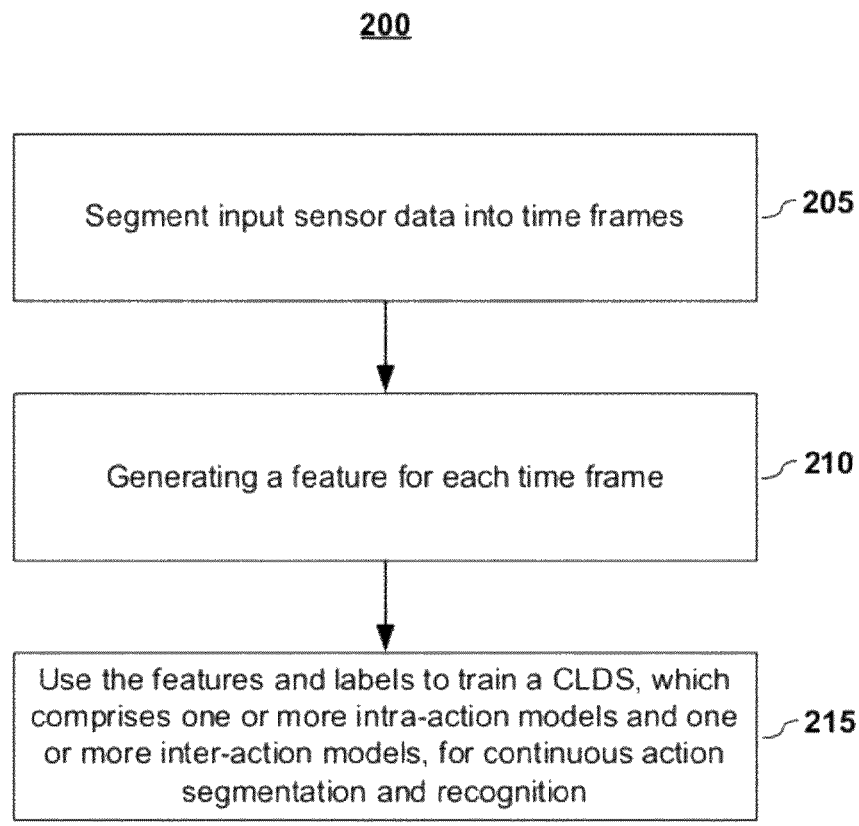
FIG. 2 depicts a method for training a Continuous Linear Dynamic System according to embodiments of the present invention.

FIG. 2 depicts a general methodology for training a Continuous Linear Dynamic System according to embodiments of the present invention. As depicted in FIG. 2, the process commences by segmenting (205) input sensor data into time frames. In embodiments, the input sensor data may be video data; however, it shall be noted that the CLDS may be used for other applications and may use other sensor data.

Given the segmented input sensor data, in embodiments, a feature for each time frame is generated (210). In embodiments in which the input sensor data is video data and the time frame data is image frames, an image feature for the image frame is generated to represent the image frame. One skilled in the art shall recognize that numerous ways exist for generating an image feature from an image frame. While any of a number of image features may be employed, in embodiments, the image feature is an embedded optical flow feature, which is described in commonly assigned and co-pending U.S. patent application Ser. No. 13/405,986 further identified above. Although the aforementioned patent document has been incorporated by reference herein in its entirety, for convenience an overview of embedded optical flow feature generation is provided below.

Returning to FIG. 2, the CLDS training process use the features and know labels to train a CLDS, which comprises one or more intra-action models (Action LDS) and one or more inter-action models (Transition LDS), for continuous action segmentation and recognition. As previously noted, in embodiments, the Transition LDS and Action LDS may be trained jointly by expectation-maximization (EM) algorithm, which is well known to those of ordinary skill in the art. In embodiments, in the E step, the optimal decomposition of the example sequences into intra/inter-action transitions are obtained, and in the M step, the LDS model parameters are learned by Maximum a Posteriori estimation. Since the action boundaries are usually given in training, it is straightforward to partition the sequences accordingly to initialize the EM process. In embodiments, approximated decomposition is sufficient if the portions between two boundaries are treated as intra-action segments, and the portions that cover the offset (ending) of a first action and the onset (starting) of the following action are used as inter-action transition segments.

Figure 3:
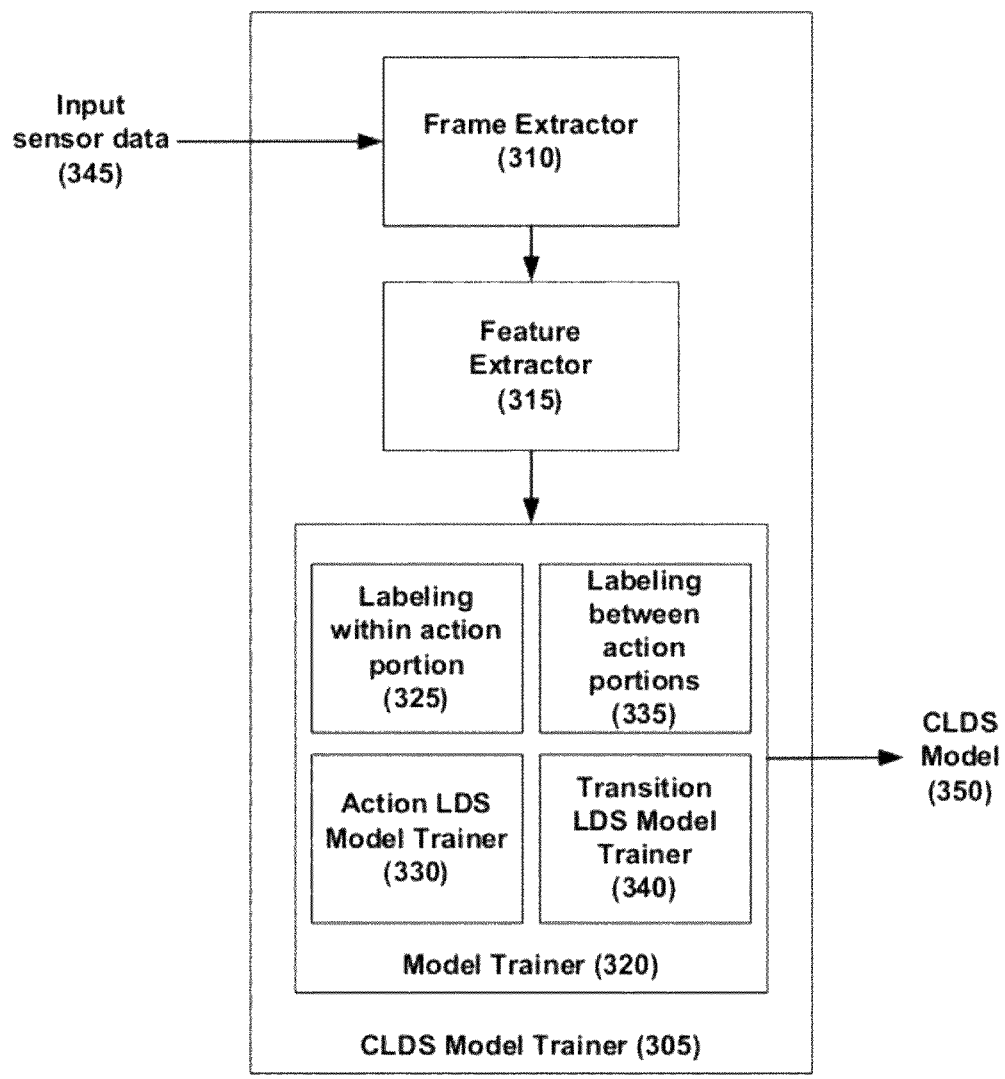
FIG. 3 depicts a block diagram of a Continuous Linear Dynamic System (CLDS) trainer for developing a CLDS according to embodiments of the present invention.

FIG. 3 depicts a block diagram of a Continuous Linear Dynamic System (CLDS) trainer for developing a CLDS according to embodiments of the present invention. In embodiments, the CLDS model trainer 305 utilizes the methods discussed above to train a CLDS model.

Figure 4:
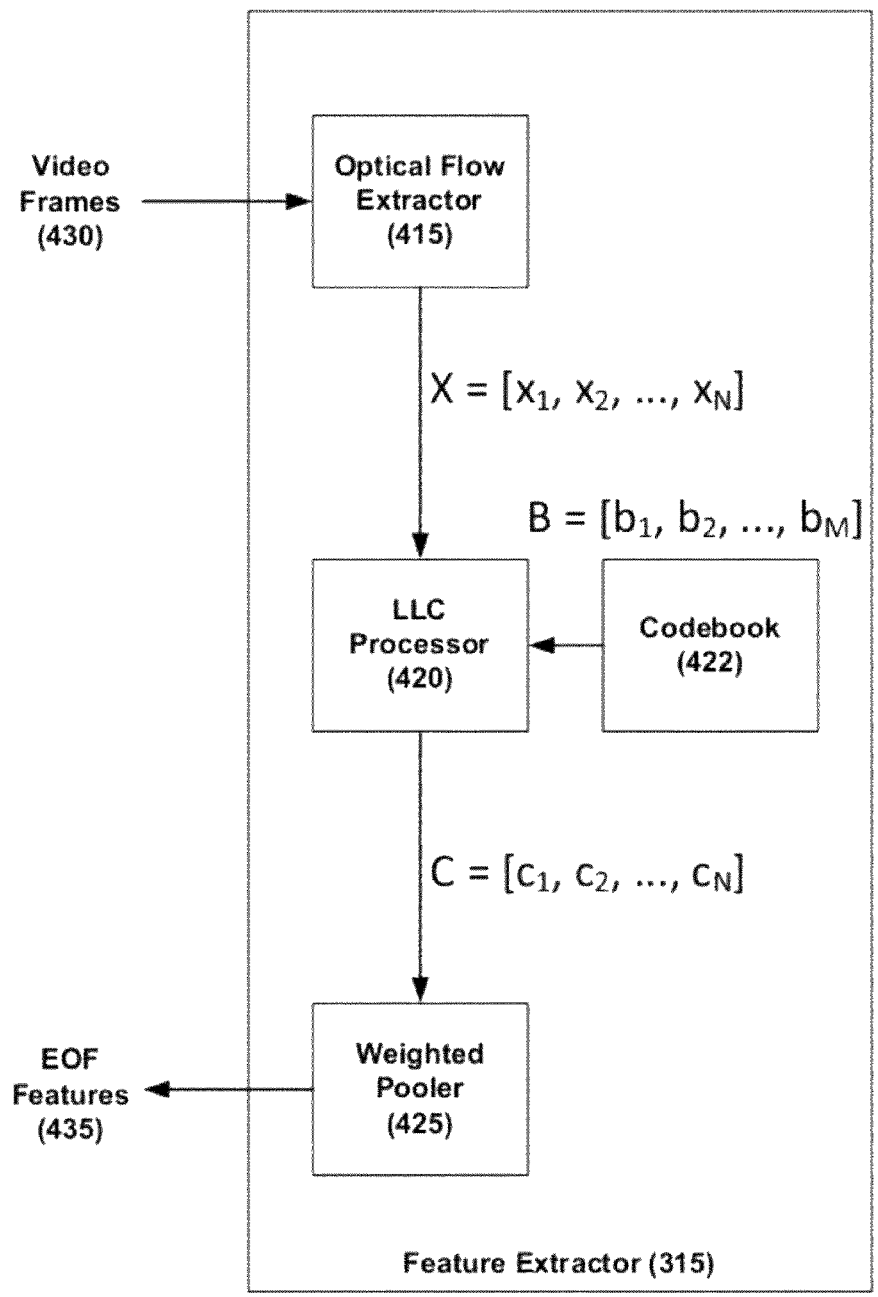
FIG. 4 depicts a block diagram of a feature extractor for generating a feature for a set of input sensor data according to embodiments of the present invention.

As shown in FIG. 3, the CLDS model trainer 305 comprises a frame extractor 310, a feature extractor 315, and a model trainer 320. In embodiments, the frame extractor 310 received input sensor data 345, such as a video, and segments the data into time frames. In embodiments, the feature extractor 315 receives the segmented data from the frame extractor 310 and extracts a feature to represent each segmented data frame. As discussed above, in embodiments, the feature may be an embedded optical flow feature. FIG. 4 depicts a block diagram of a spatial feature extractor 315 for generating an embedded optical flow (EOF) feature according to embodiments of the invention.

As depicted in FIG. 4, the process flow commences by receiving input sensor data, which for this depicted embodiment is video frames 430. It should be noted that, in embodiments, a spatial pyramid technique may be applied, where the image frame may be divided into two or more sections and one or more of the subsequent steps may be processed by sections.

Having extracted frames from the input video, optical flows are extracted from the frames. In embodiments, the optical flow may be computed using, by way of example and not limitation, Harris interest point detection to detect feature point from the frames and a Lucas-Kanade method to calculate the optical flow for each feature point. Other methods for obtaining optical flows which are known to those of ordinary skill in the art may also be employed. In embodiments, motion information is represented based on optical flows because they are fast to compute and robust against many transforms. It shall be noted that for purposes of explanation two-dimensional (2D) examples are depicted herein; however, it shall be noted that the systems and methods may be applied to different dimensionalities.

The LLC processor 420 receives the optical flows from the optical flow extractor 415 and uses the optical flows to generate higher-order codes. Embodiments of the EOF methodology utilize an optical flow codebook. In embodiments, the optical flow codebook 422 may be a previously generated codebook. Alternatively, in embodiments, a small set of frames may be used to provide training samples to build the optical flow codebook. In embodiments, a codebook may be generated if the optical flow in the testing/detecting video exhibits significantly different distributions from the training frames. Such situations usually happen with the change of task environment factors, such as the set of actions to be recognized, the parameters of camera or sensor, the complexity of background, etc.

Using a codebook, a Locality-constrained Linear Coding (LLC) processor 420 is applied to embed each optical flow into a higher-dimensional code. Although LLC methods are well known to those of ordinary skill in the art, presented below are embodiments for obtaining codes from the optical flows using LLC.

As depicted in FIG. 4, a process flow is shown for generating higher-dimensional codes, or sparse coding vectors, for the optical flows according to embodiments of the present invention. The LLC 420 receives a set of optical flow vectors denoted as $X=[x_1, x_2, \ldots, x_N] \in \mathbb{R}^{2 \times N}$, for a given codebook with M entries, $B=[b_1, b_2, \ldots, b_M] \in \mathbb{R}^{2 \times M}$. As explained below, the LLC coding-based process converts each optical flow vector $x^i$ into a corresponding higher-dimensional code $c_i \in \mathbb{R}^M$.

In embodiments, the coding step solves the following criteria in general:

$$C^* = \underset{C}{\operatorname{argmin}} \sum_{i=1}^{N} \|x_i - Bc_i\|^2 + \lambda \Psi(c_i), \quad (11)$$
$$\text{s.t. } \Omega(c_i) = 0 \forall i,$$

It can be found that, using the vector quantization (VQ) criteria, i.e., $\Omega(c_i):\|c_i\|_{l^0}=1, \|c_i\|_{l^1}=1, \& c_i \geq 0$, and average pooling, $\bar{c}$ becomes a histogram of optical flow. In embodiments, the LLC coding uses a different regularization term $\Psi(c_i)$ to enforce locality, and the criteria equals to solving the following objective:

$$\tilde{C}^* = \underset{\tilde{C}}{\operatorname{argmin}} \sum_{i=1}^{N} \|x_i - B_i \tilde{c}_i\|^2, \quad (12)$$
$$\text{s.t. } 1^T \tilde{c}_i = 1 \forall i,$$

where $B_i$ contains the k nearest neighbors of $x_i$ from B.

Since there are multiple higher-dimensional codes from each frame, pooler 425 using a weighted pooling strategy to combine the multiple higher-dimensional codes for a frame so that a single feature vector can be used to represent the frame. That is, the pooling step $f(\cdot)$ combines multiple codes into one single feature vector $\bar{c}=f(C)$.

To combine multiple LLC codes into the final image feature, prior methods have used max-pooling. It has been shown that that max-pooling is well suited for highly overcompleted codebook where codewords have low probability of being active. However, such is not the case where an observed optimal codebook size is relatively small. Also, an optical flow is likely not that reliable as compared to SIFT or HOG descriptors; max-pooling becomes very sensitive to noise.

To overcome these limitations, embodiments herein utilize different pooling strategies to further improve the performance of measuring the distance between two image features by linearly combining the per-point contribution, and linear distance measure is sufficient. Existing histogram-type features based on average-pooling use non-linear distance metric to achieve good performance, such as the $\chi^2$ distance based on KL divergence. The Bhattacharyya distance has also been used to measure the distance between two distribution of local image patches, which leads to the following criteria:

$$f(C) = \sum_{i=1}^{N} \left\| \frac{c_i}{\sqrt{P_o(x_i)}} \right\| \quad (13)$$

where the weight of code $c_i$ is inversely proportional to the square root of $P_o(x_i)$, which is the posterior of $x_i$.

In embodiments, to adopt Equation (13) for the EOF feature, a challenge is how to obtain $P_o(x_i)$ that is not readily available as that in Gaussian mixture model (GMM). In embodiments, computing $P_o(x_i)$ may be performed as follows. The method starts from uniform prior for each descriptor $x_i$ and basis vector $b_j$, i.e., $$P_r(x_i) = \frac{1}{N} \text{ and } P_r(b_i) = \frac{1}{M}.$$

The generative model from $b_j$ to $x_i$ is initially assumed to be a Gaussian, i.e., $$P(x_i | b_j) = \exp\left(\frac{-\|x_i - b_j\|^2}{\sigma^2}\right), \quad (14)$$

where $\sigma$ is a bandwidth parameter. Then, $$P(b_j | x_i) = \frac{P(x_i | b_j) P_r(b_j)}{\sum_k P(x_i | b_k) P_r(b_k)} = \frac{P(x_i | b_j)}{\sum_k P(x_i | b_k)} \quad (15)$$

Experiments by the inventors indicate that smaller $\sigma$ gives better accuracy, and the best performance is achieved when Equation (4) reduces to a Dirac Delta function. In embodiments, this may be approximated using Hard-VQ where $P(b_j|x_i)=1$ if $j=j^*$ the quantization bin, and 0 otherwise. Then, the posterior of each basis vector (a histogram) is $$P_o(b_j) = \frac{1}{N} \sum_i P(b_j | x_i) = \frac{1}{N} sum(j = j^*)$$

And $P_o(x_i)$ may be computed by:

$$P_o(x_i) = \sum_j P(x_i | b_j) P_o(b_j) = P(x_i | b_{j^*}) P_o(b_{j^*}) = P_o(b_{j^*}) \quad (16)$$

Finally, $$y = CP_o^{-\frac{1}{2}}(X)$$

is the EOF feature from image I, where $$P_o^{-\frac{1}{2}}(X) = \left[P_o^{-\frac{1}{2}}(x_1), P_o^{-\frac{1}{2}}(x_2), \ldots, P_o^{-\frac{1}{2}}(x_N)\right]^T.$$

In embodiments, the pooler 425 normalizes each feature, which may be performed as follows:

$$y_{norm} = \frac{y}{\|y\|_2}$$

It shall be noted that EOF feature is quite different from prior approaches. As compared to HOOF, embodiments of the methodologies of the current patent document do not generate a histogram to represent the frame. And, as compared to STIP, embodiments of the methodologies of the current patent document do not use temporal interest point but use spatial interest point, which allow for the temporal pattern to be modeled by classifier.

It shall also be noted that histogram-type feature based on optical flow have been used in describing motion for action recognition. Since histograms are non-Euclidean, modeling the evolution of histogram requires non-linear sequential models, such as a Non-Linear Dynamic System using Binet-Cauchy kernel. Unlike traditional histogram-type feature that is based on Vector Quantization (VQ), coding based image feature has better linear separability as proven by recent works in image classification. Since EOF is based on the LLC coding, its temporal evolution can be accurately described using linear models. It shall be noted that there has been no prior work on using first-order coding criteria (such as LLC) to represent a frame for action recognition. It shall also be noted that the weighted pooling methods for the EOF feature outperforms the original LLC feature.

Returning to FIG. 3, after a continuous video is converted into an EOF time series, the EOF time series may be used by the model trainer 320 to train a CLDS for continuous action segmentation and recognition. In embodiments, the model trainer 320 comprises a module for labeling within action portions 325 that works in conjunction with Action LDS model trainer 330 to train the Action LDS models for intra-actions. Similarly, in embodiments, the model trainer 320 comprises a module for labeling between action portions 335 that works in conjunction with Transition LDS model trainer 340 to train the Transition LDS models for inter-actions. As previously noted, in embodiments, the model trainer 320 may train the Transition LDS models and Action LDS models jointly by expectation-maximization (EM) algorithm, which is well known to those of ordinary skill in the art.

Figure 5:
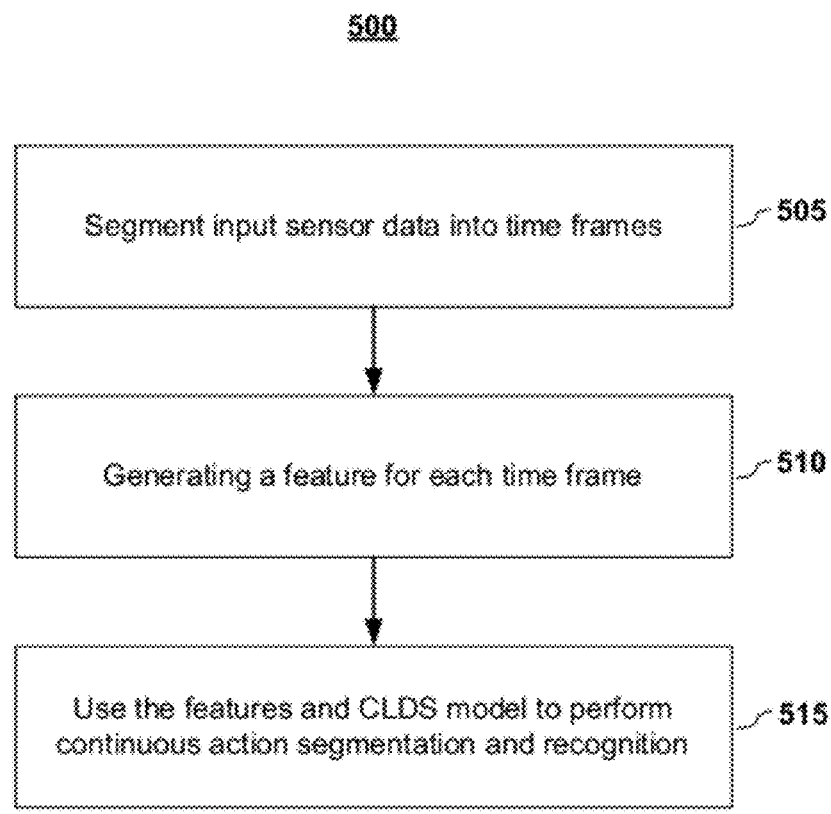
FIG. 5 depicts a method for using a Continuous Linear Dynamic System (CLDS) to detect and label actions in input sensor data according to embodiments of the present invention.

FIG. 5 depicts a method for using a Continuous Linear Dynamic System (CLDS) to detect and label actions in a video according to embodiments of the present invention. As depicted in FIG. 5, the process commences by segmenting (505) input sensor data into time frames. In embodiments, the input sensor data may be video data and the segmented time frames may be image frames, although other sensor data and configurations may be used. Given the segmented input sensor data, a feature for each image frame is generated (510). In embodiments, an image feature for the frame may be an embedded optical flow as previously discussed. These images features are then input into a CLDS model to perform (515) continuous segmentation and recognition. In embodiments, the CLDS model may use one or more of the inference methods discussed above or known to those of ordinary skill in the art.

Figure 6:
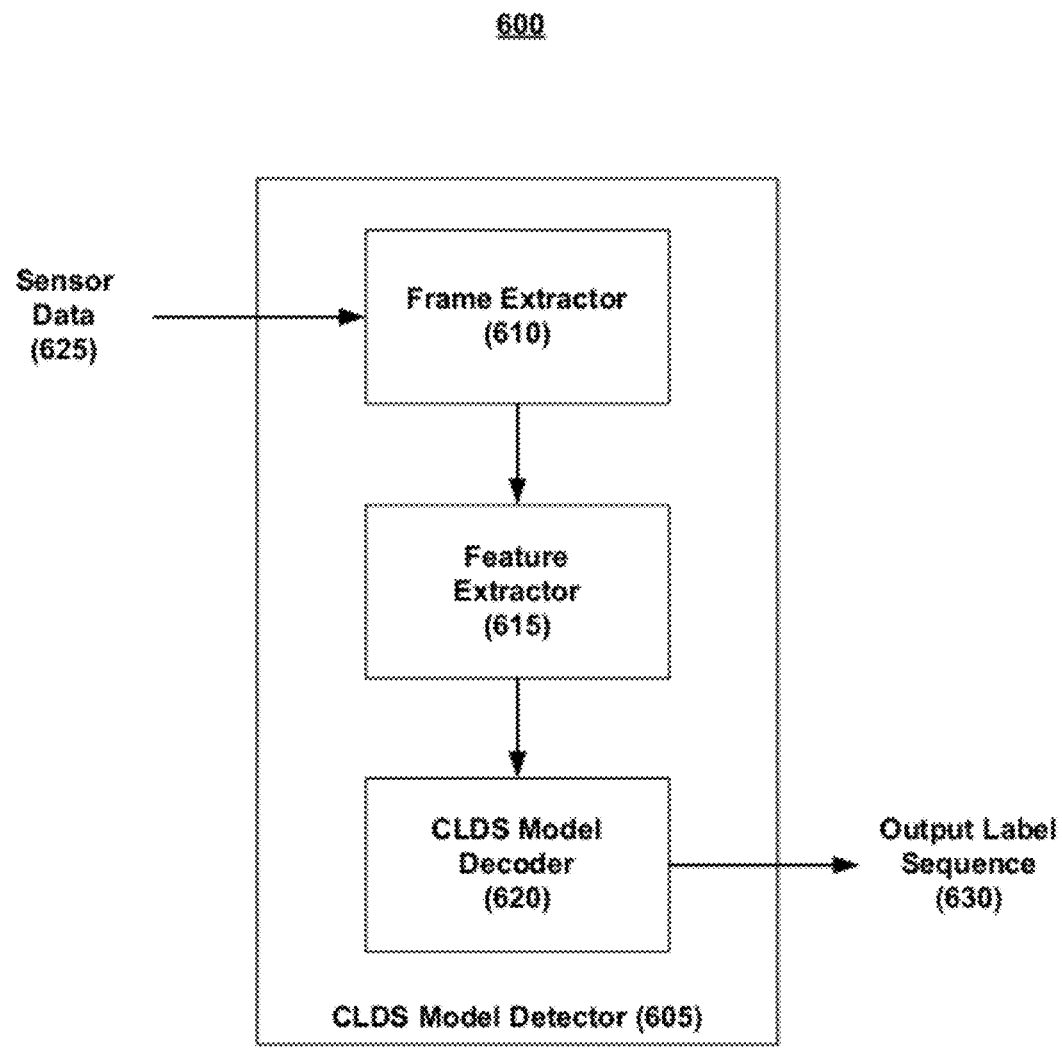
FIG. 6 depicts a block diagram of a Continuous Linear Dynamic System (CLDS) model detector for detecting and labeling actions according to embodiments of the present invention.

FIG. 6 depicts a block diagram of a Continuous Linear Dynamic System (CLDS) model detector 605 according to embodiments of the present invention. The CLDS model detector 605 receives input sensor data 625 and outputs a sequence of labels 630. As shown in FIG. 6, the CLDS model detector 605 comprises a frame extractor 610, a feature extractor 615, and a CLDS model decoder 620. In embodiments, CLDS model detector performs one or more methods for continuous segmentation and recognition, which include but are not limited to the methods discussed above.

For example, in embodiments, the frame extractor 610 received input sensor data 625, such as a video, and segments the data into time frames. The feature extractor 615 receives the segmented data from the frame extractor 610 and extracts a feature to represent each of the segmented data. As discussed above, in embodiments, the feature may be an embedded optical flow feature. Finally, the CLDS model decoder 620 receives the features, which acts as observations for the CLDS model. The trained CLDS model uses these features to estimate action labels, including transition labels. In embodiments, the CLDS model may use one or more of the inference methods discussed above or known to those of ordinary skill in the art.

Figure 7:
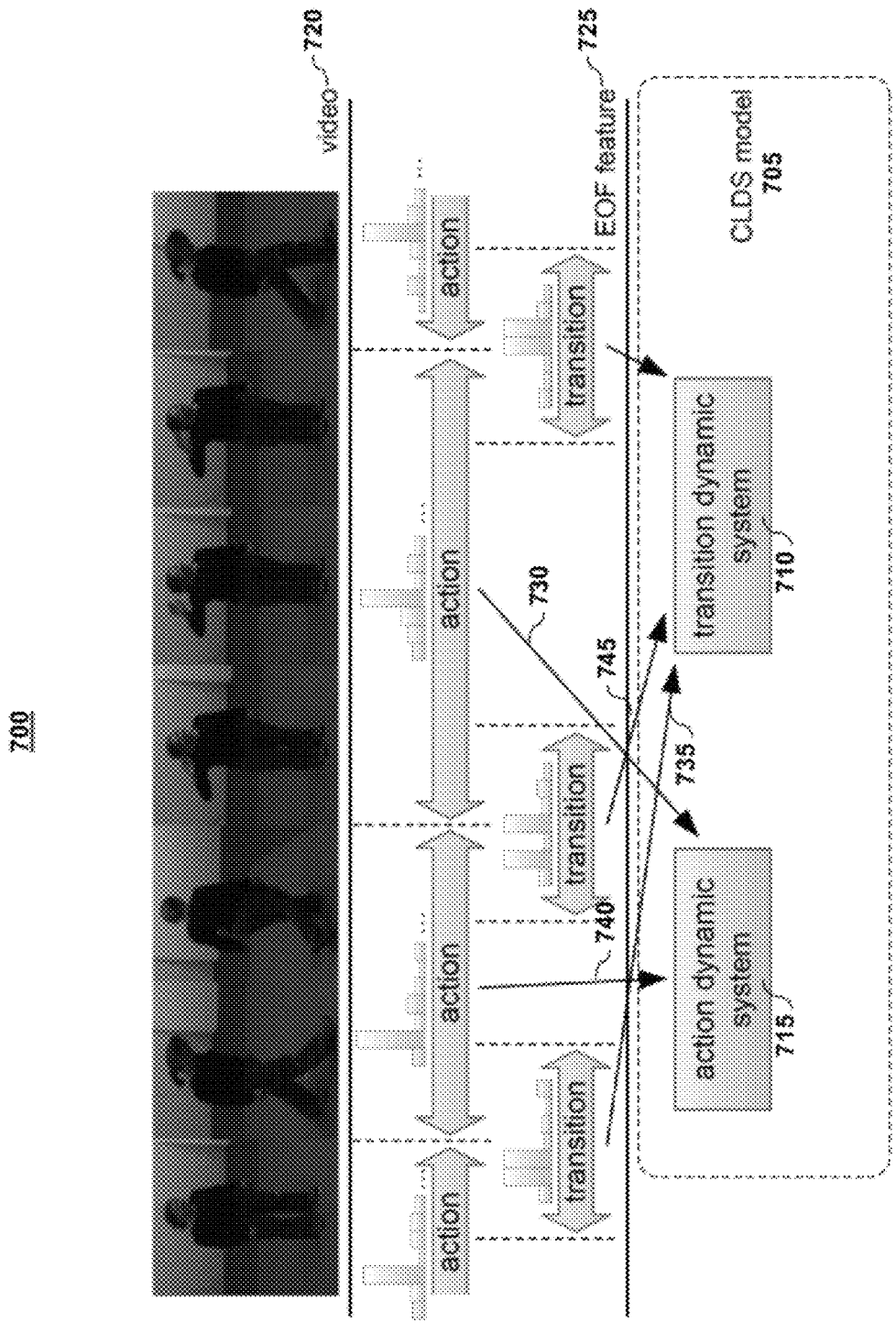
FIG. 7 illustrates a flowchart of the Embedded Optical Flow feature and the Continuous Linear Dynamic System framework for simultaneously action primitive segmentation and recognition from continuous video according to embodiments of the present invention.

FIG. 7 illustrates a flowchart of the Embedded Optical Flow feature and the Continuous Linear Dynamic System for simultaneously action primitive segmentation and recognition from continuous video according to embodiments of the present invention. As shown in FIG. 7, a CLDS model 705 comprises an action dynamic system 715 and transition dynamic system 720, which are used to help segment and recognize actions. Using the features, such as EOF features 725, the CLDS model 705 dynamically recognizes actions, including transitions, by dynamically switching between action LDS modeling (e.g., actions 730 and 740) and transition LDS modeling (e.g., 735 and 745).

Results and Experiments

Results are presented herein to demonstrate possession of the inventive aspects presented in the current patent document and to demonstrate its improved results over prior methods. These results were performed using specific embodiments and under specific conditions; accordingly, nothing in these results sections shall be used to limit the inventions of the present patent document. Rather, the inventions of the present patent document shall embrace all alternatives, modifications, applications and variations as may fall within the spirit and scope of the disclosure.

To evaluate the performance of CLDS and of combining EOF feature and CLDS for simultaneously action primitive segmentation and recognition, experiments were performed on two public datasets and additional in-house collected datasets were also used. The two public datasets were the Idiap dataset (see, for example, A. Just and S. Marcel, "Two-Handed Gesture Recognition," IDIAP Research Report 24, IDIAP Research Inst., 2005 (hereinafter, "Reference 1"), which is incorporated herein by reference in its entirety) and the IXMAS dataset (see, for example, D. Weinland and E. Boyer, "Action recognition using exemplar-based embedding," in Proc. of Computer Vision and Pattern Recognition (CVPR '08), 1-7, 2008 (hereinafter, "Reference 2"); and D. Weinland, R. Ronfard, and E. Boyer, "Free Viewpoint Action Recognition Using Motion History Volumes," Computer Vision and Image Understanding (CVIU), 2006 (hereinafter, "Reference 3"), each of which is incorporated herein by reference in its entirety).

Idiap Dataset.

The setting of the Idiap dataset allowed for synthesizing continuous action sequences by concatenating a series of actions performed by the same person. Three hundred (300) sequences were obtained for training and one hundred (100) were obtained for testing. Each sequence contained 4~6 action primitives. The extracted EOF feature was used by the CLDS framework and for comparison by four other techniques. These other techniques were: Conditional Random Fields (CRF) (as discussed in J. Lafferty, A. McCallum, and F. Pereira, "Conditional Random Fields: Probabilistic Models for Segmenting and Labeling Sequence Data," Proc. of the 18th International Conference on Machine Learning (ICML'01), 2001 (hereinafter, "Reference 4"); Latent Dynamic Conditional Random Field (LDCRF) (as discussed in L. Morency, A. Quattoni, and T. Darrell, "Latent-Dynamic Discriminative Models for Continuous Gesture Recognition," in Proc. of Computer Vision and Pattern Recognition (CVPR '07), 2007 (hereinafter, "Reference 5"); Switching Linear Dynamic System (SLDS) (as discussed in S. Oh, J. Rehg, T. Balch, and F. Dellaert, "Learning and Inference in Parametric Switching Linear Dynamic Systems," in Proc. of International Conference on Computer Vision (ICCV '05), 2005 (hereinafter, "Reference 6"); and duration SLDS (dSLDS) (as discussed, for example, in S. M. Oh, J. M. Rehg, and F. Dellaert, "Parameterized Duration Modeling for Switching Linear Dynamic Systems," in Proc. of Computer Vision and Pattern Recognition (CVPR '06), 1-8, 2006 (hereinafter, "Reference 7"). Each of the aforementioned documents is incorporated herein by reference in its entirety. Table 2 column 2 (below) lists the average per-frame accuracy.

IXMAS Dataset.

Leave-one-subject-out cross-validation was performed with this dataset. The input to the CLDS algorithm was the EOF feature concatenated from all five camera views. A continuous recognition score of 68.05% based on Levenshtein distance has been reported in K. Kulkarni, S. Cherla, and A. Ramasubramanian, "A Framework for Indexing Human Actions in Video," in Proc. of the International Workshop on Machine Learning for Vision-based Motion Analysis (MLVMA '08), 2008 (which is incorporated herein by reference in its entirety). And the score of CLDS was significantly better at 86.84%. Since this measure does not consider the miss-alignment of action boundaries, in Table 2 column 3 (below) we also applied the per-frame accuracy measure. The results in Table 2 demonstrate the superior performance of the CLDS framework for both the public datasets.

TABLE 2

Continuous recognition accuracy using public dataset

| method | Idiap | IXMAS |
|---|---|---|
| CRF [Ref. 4] | 69.32% | 60.58% |
| LDCRF [Ref. 5] | 87.91% | 57.82% |
| SLDS [Ref. 6] | 71.07% | 53.61% |
| dSLDS [Ref. 7] | 80.71% | 73.42% |
| CLDS | 95.46% | 78.78% |

In-House Datasets I/II.

Figure 8:
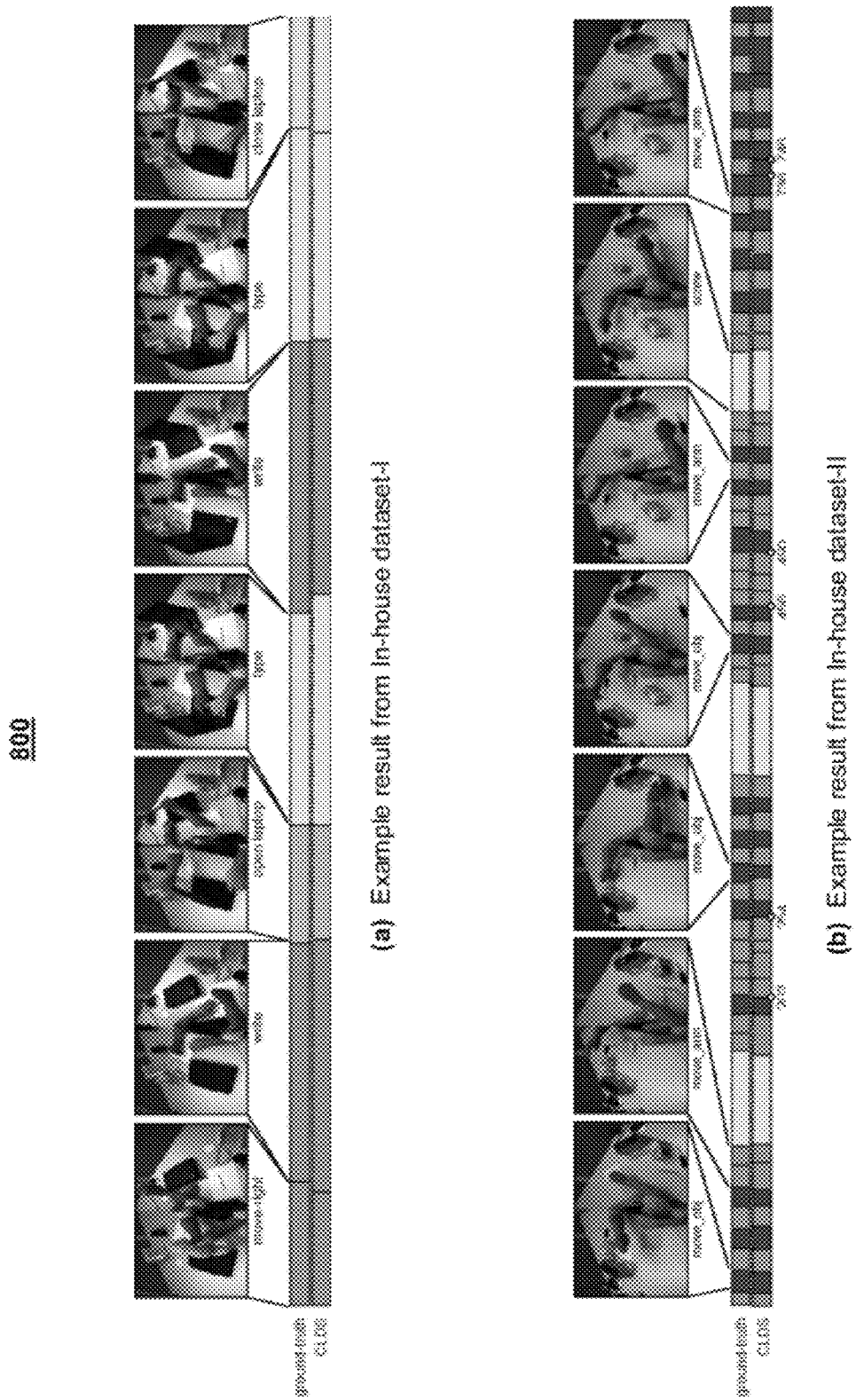
FIGS. 8(*a*) and 8(*b*) graphically depict results of continuous action recognition and segmentation for two in-house datasets according to embodiments of the present invention.

In-house datasets were collected to further examine the CLDS framework. The dataset comprised two sets. Set I includes 30 sequences from a multi-view setup as shown in FIG. 8(*a*). Each sequence contains 5 to 7 of the following office actions: "write," "drink," "open (laptop)," "type," "close (laptop)," "phone (call)," "move (toy) left," and "move (toy) right." The objects in the scene were placed at relatively fixed locations after manipulation. Twenty (20) of the sequences were used for training and the rest for testing. FIG. 8(*a*) graphically depicts results of continuous action recognition and segmentation for Set I of the in-house datasets according to embodiments of the present invention.

Set II captured the actions of moving/grasping/placing three objects and screwing a fourth object with a screw driver. These actions can be grouped into three primitives, "movearm," "move-obj," and "screw." Set II is more challenging than Set I in that the location of the object varies after manipulation and the same primitive action may repeat while the boundaries need to be identified. There were 310 actions performed in 6 sequences, and leave-one-out cross-validation was used. The performance was tested with/without the change of object location obtained by color-based detection ($\Delta(x,y)$ in Table 3). FIG. 8(*b*) graphically depicts example results for Set II according to embodiments of the present invention.

TABLE 3

Continuous recognition accuracy using in-house set

| | Set I | Set II | |
|---|---|---|---|
| method | average | average w $\Delta(x, y)$ | wo $\Delta(x, y)$ |
| CRF [Ref. 4] | 86.75% | 63.26% | 63.26% |
| LDCRF [Ref. 5] | 89.20% | 72.16% | 71.09% |
| SLDS [Ref. 6] | 85.10% | 73.58% | 66.47% |
| dSLDS [Ref. 7] | 87.38% | 82.82% | 76.18% |
| CLDS | 91.09% | 91.35% | 79.38% |

Table 3 lists the results for the in-house dataset. As can be observed, CLDS gave better per-frame accuracy than other benchmark algorithms for both sets I/II. In addition, CLDS can accurately segment repeated action primitives, such as those between frame 202~254 and between 456~490 in FIG. 8(*b*). It is also interesting to note that, between frame 736~746, although the recognized action type was incorrect, the action boundaries could still be located, because the intra/inter action primitive transition was correctly recognized by the Transition LDS.

Figure 9:
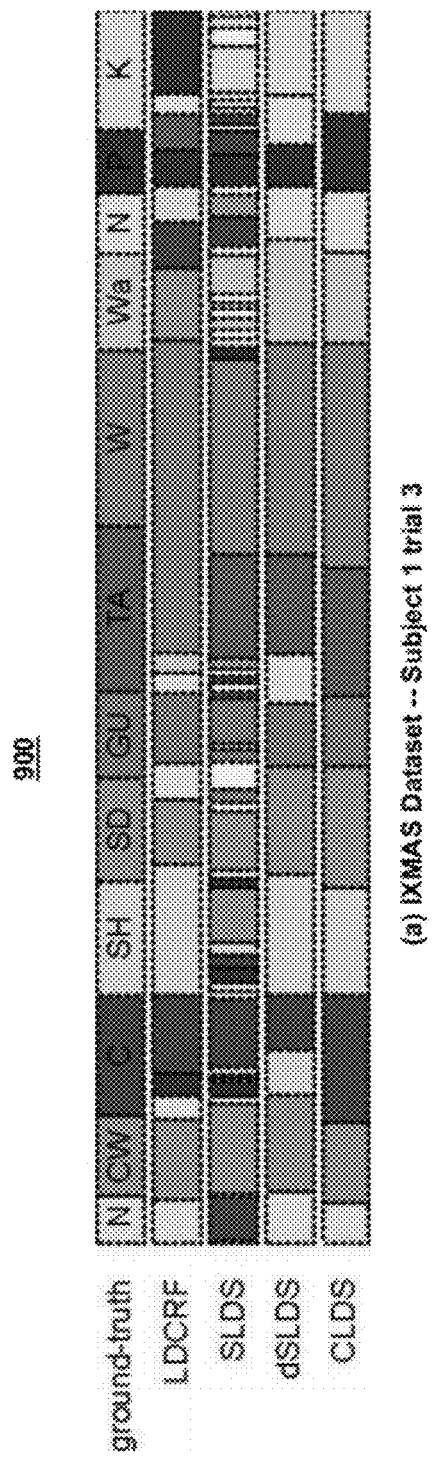
FIG. 9 graphically depicts results of continuous action recognition and segmentation for the IXMAS dataset according to embodiments of the present invention.
Figure 9:
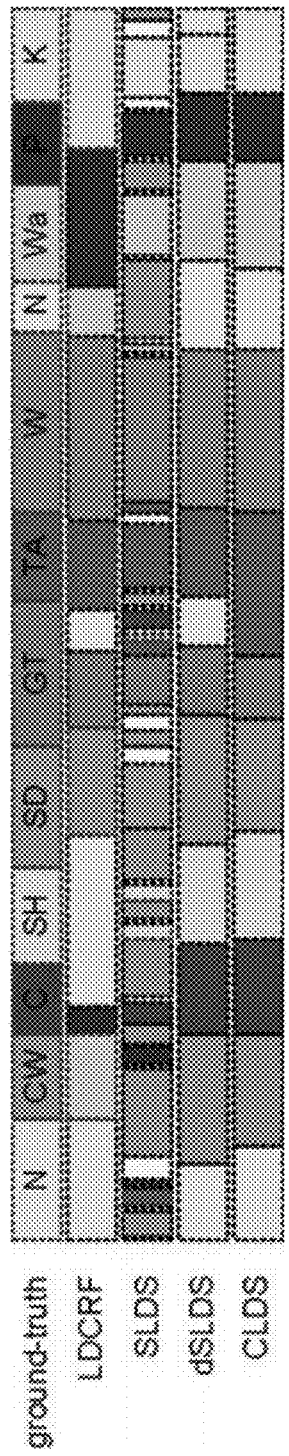

To further examine the improved performance brought by the CLDS algorithm, two continuous action recognition results from the IXMAS dataset were plotted, which are reproduced in FIG. 9. In the SLDS results, short and frequent switchings between incorrect action types were observed during action transitions. This is caused by the mismatch between the transition dynamics to any action models, and the lack of strong penalty for switching into incorrect action types. The dSLDS limited such short transition by considering the duration constraint, which leads to clearer segmentation boundary. However, on the other side, when inaccurate duration model is applied, such as for the "noise" class, the estimator could not jump out of an incorrect action type before the duration constraint was satisfied. This caused the false detection of several "noise" actions in FIG. 9. CLDS instead uses additional models (the Transition LDS) to describe the transitions between successive actions. Hence, it distinguishes the dynamics before, during, and after action primitives better than SLDS. At the same time, CLDS does not have the duration constraint during inference; hence, it is more flexible than dSLDS for action types with inaccurate duration model. Such capacity makes CLDS a suitable framework for many continuous time series data analysis problems, such as robotic PbD, sign language recognition, gesture recognition, etc.

System Embodiments

Figure 10:
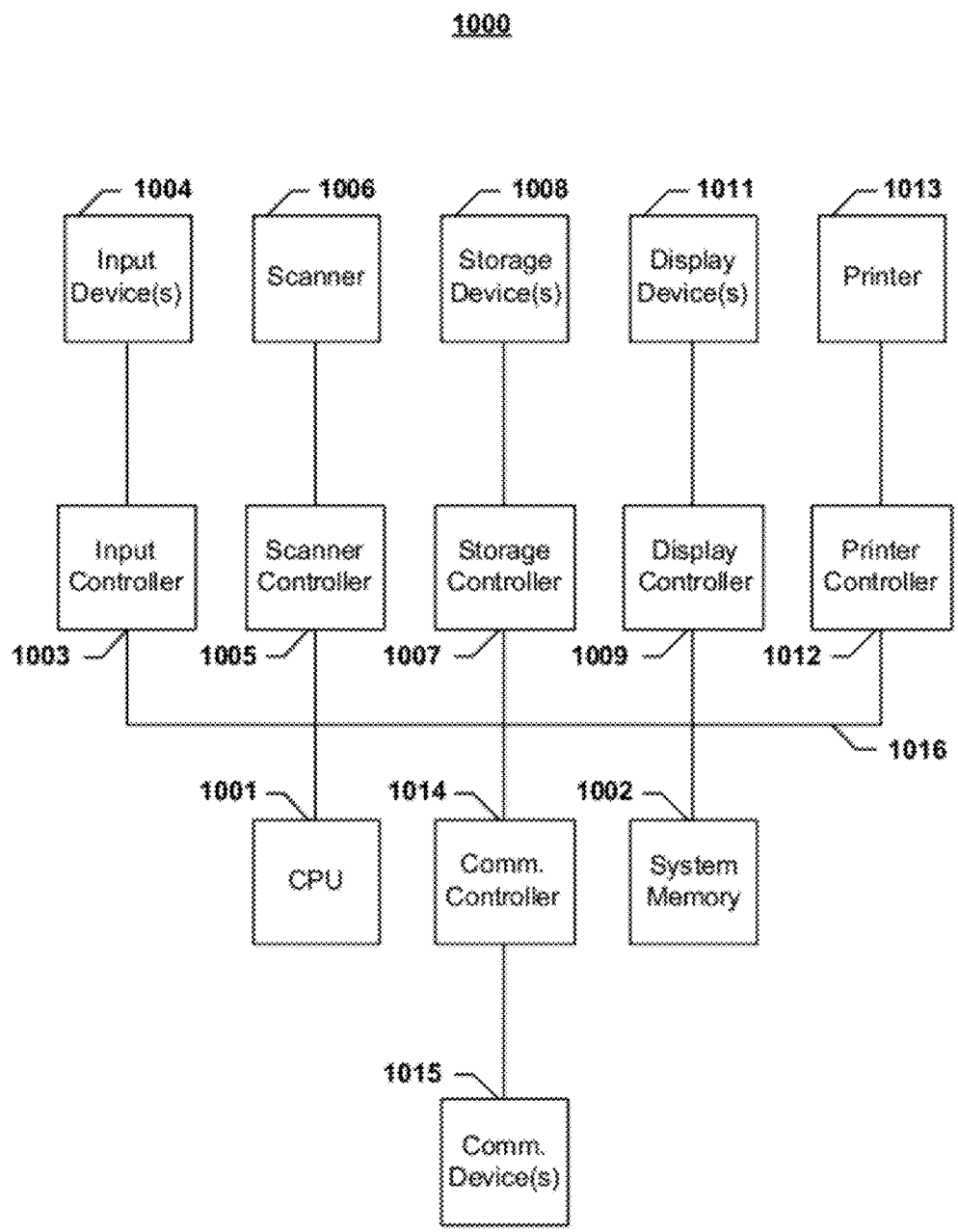
FIG. 10 depicts a block diagram illustrating an exemplary system which may be used to implement aspects of the present invention.

Having described the details of the invention, an exemplary system 1000, which may be used to implement one or more aspects of the present invention, will now be described with reference to FIG. 10. As illustrated in FIG. 10, the system includes a central processing unit (CPU) 1001 that provides computing resources and controls the computer. The CPU 1001 may be implemented with a microprocessor or the like, and may also include a graphics processor and/or a floating point coprocessor for mathematical computations. The system 1000 may also include system memory 1002, which may be in the form of random-access memory (RAM) and read-only memory (ROM).

A number of controllers and peripheral devices may also be provided, as shown in FIG. 10. An input controller 1003 represents an interface to various input device(s) 1004, such as a keyboard, mouse, or stylus. There may also be a scanner controller 1005, which communicates with a scanner 1006. The system 1000 may also include a storage controller 1007 for interfacing with one or more storage devices 1008 each of which includes a storage medium such as magnetic tape or disk, or an optical medium that might be used to record programs of instructions for operating systems, utilities and applications which may include embodiments of programs that implement various aspects of the present invention. Storage device(s) 1008 may also be used to store processed data or data to be processed in accordance with the invention. The system 1000 may also include a display controller 1009 for providing an interface to a display device 1011, which may be a cathode ray tube (CRT), a thin film transistor (TFT) display, or other type of display. The system 1000 may also include a printer controller 1012 for communicating with a printer 1013. A communications controller 1014 may interface with one or more communication devices 1015, which enables the system 1000 to connect to remote devices through any of a variety of networks including the Internet, a local area network (LAN), a wide area network (WAN), or through any suitable electromagnetic carrier signals including infrared signals.

In the illustrated system, all major system components may connect to a bus 1016, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including magnetic tape or disk or optical disc, or a transmitter, receiver pair.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

While the inventions have been described in conjunction with several specific embodiments, it is evident to those skilled in the art that many further alternatives, modifications, and variations will be apparent in light of the foregoing description. Thus, the inventions described herein are intended to embrace all such alternatives, modifications, applications and variations as may fall within the spirit and scope of the appended claims.

What is claimed is:

1. A non-transient computer-readable medium or media comprising one or more sequences of instructions which, when executed by one or more processors, causes steps for recognizing a sequence of actions comprising:
   segmenting input sensor data into time frames;
   generating a feature for each time frame;
   for a time frame, selecting an action associated with a maximized value of an objective function that comprises a first set of feature-dependent models for intra-action transitions and a second set of feature-dependent models for inter-action transitions;
   wherein the feature-dependent models are based a on linear dynamic system models; and
   wherein the objective function models a hidden state at a current time frame as being directly dependent upon a hidden state for a sequence of one or more time frames prior to the current time frame, an estimated action for the sequence of one or more time frames prior to the current time frame, and an estimated action of the current time frame.

2. The computer-readable medium or media of claim 1 wherein the second set of feature-dependent models for inter-action transitions comprise at least one model for a transition between a same action.

3. The computer-readable medium or media of claim 1 wherein the input sensor data is a video and the process of segmenting input sensor data into time frames comprises:
   segmenting the video data into image frames.

4. The computer-readable medium or media of claim 3 wherein the feature for each image frame is an embedded optical flow feature formed by pooling a set of sparse coding vectors extracted from the image frame based upon a weighting of a distribution of a set of local motion features in the image frame.

5. The computer-readable medium or media of claim 4 wherein extracting spare coding vectors from the image frame comprises:
   obtaining the set of local motion features for the image frame;
   generating the set of sparse coding vectors by generating a sparse coding vector for each local motion feature from the set of local motion features; and
   forming the embedded optical flow feature that represents the image frame by pooling the set of sparse coding vectors based upon a weighting of the distribution of the set of local motion features and normalizing the pooled sparse coding vector.

6. The computer-readable medium or media of claim 5 wherein pooling the set of sparse coding vectors based upon a weighting of the distribution of the set of local motion features comprises:

pooling the set of sparse coding vectors for the image frame by weighting each sparse coding vector by an inverse proportional to a square root of a posterior of a local motion feature corresponding to the sparse coding vector.

7. A computer-implement method for recognizing a sequence of actions comprising:

modeling actions comprising a plurality of action dynamic models, wherein each dynamic model comprises a label associated with an action that it models;

modeling at least one transition between actions comprising at least one transition dynamic model, wherein each of the at least one transition dynamic model comprises a label associated with a transition between actions that it models; and for a feature representing a set of input sensor data for a time frame, selecting an action associated with the dynamic model that maximizes an objective function, wherein a transition probability from one action to another action is calculated using at least one transition dynamic model;

wherein the transition probability of a hidden state at a current time frame is directly dependent upon a hidden state for a sequence of one or more time frames prior to the current time frame, an estimated action for the sequence of one or more time frames prior to the current time frame, and an estimated action of the current time frame.

8. The computer-implement method of claim 7 wherein input sensor data is a video and the method further comprises:

segmenting the video data into image frames;
obtaining a set of optical flow features for the image frame;
generating the set of sparse coding vectors by generating a sparse coding vector for each local motion feature from the set of optical flow features; and
forming the feature that represents the image frame by pooling the set of sparse coding vectors based upon a weighting of the distribution of the set of optical flow features and normalizing the pooled sparse coding vector.

9. The computer-implement method of claim 8 wherein pooling the set of sparse coding vectors based upon a weighting of the distribution of the set of local motion features comprises:

pooling the set of sparse coding vectors for the image frame by weighting each sparse coding vector by an inverse proportional to a square root of a posterior of a local motion feature corresponding to the sparse coding vector.

10. The computer-implement method of claim 7 further comprising:

using example sequences to train the action dynamic models and the at least one transition dynamic model.

11. The computer-implement method of claim 10 wherein using example sequences to train the action dynamic models and the at least one transition dynamic model comprises:

jointly training the action dynamic models and the at least one transition dynamic model using expectation-maximization (EM) methodology, wherein optimal decomposition of the example sequences into intra-action and inter-action transitions are obtained in an expectation step, and linear dynamic system model parameters are learned by maximum a posteriori estimation.

12. A computer-implemented method for recognizing a sequence of actions comprising:

segmenting input sensor data into time frames;
generating a feature for each time frame;
for a time frame, selecting an action associated with a maximized value of an objective function that comprises a first set of feature-dependent models for intra-action transitions and a second set of feature-dependent models for inter-action transitions;
wherein said input sensor data is a video and the process of segmenting input sensor data into time frames comprises segmenting the video data into image frames; and
wherein the feature for each image frame is an embedded optical flow feature formed by pooling a set of sparse coding vectors extracted from the image frame by weighting each sparse coding vector obtained from a local motion feature extracted from the image frame by an inverse proportional to a square root of a posterior of the local motion feature corresponding to the sparse coding vector.

13. The computer-implemented method of claim 12 wherein the feature-dependent models are based upon linear dynamic system models.

14. The computer-implemented method of claim 13 wherein the objective function models a hidden state at a current time frame as being directly dependent upon a hidden state for a sequence of one or more time frames prior to the current time frame, an estimated action for the sequence of one or more time frames prior to the current time frame, and an estimated action of the current time frame.

15. The computer-implemented method of claim 12 wherein the second set of feature-dependent models for inter-action transitions comprise at least one model for a transition between a same action.

* * * * *